United States Patent [19]

Haas et al.

[11] Patent Number: 5,577,168
[45] Date of Patent: Nov. 19, 1996

[54] BEACON BASED PACKETIZED CELLULAR SYSTEM WITH REAL-TIME PROCESSING

[75] Inventors: Zygmunt Haas, Holmdel; Chih-Lin I, Manalapan, both of N.J.

[73] Assignee: Lucent Technologies Inc., Murray Hill, N.J.

[21] Appl. No.: 377,291

[22] Filed: Jan. 23, 1995

Related U.S. Application Data

[63] Continuation of Ser. No. 130,965, Oct. 4, 1993, abandoned.
[51] Int. Cl.⁶ ........................................ H04Q 7/22
[52] U.S. Cl. .................... 455/33.2; 455/54.1; 455/56.1; 379/60
[58] Field of Search ........................... 455/33.1, 33.2, 455/33.4, 54.1, 54.2, 56.1; 379/59, 60, 63; 370/95.1, 95.3, 94.1, 94.2, 85.12

[56] References Cited

U.S. PATENT DOCUMENTS

| | | | |
|---|---|---|---|
| 4,112,257 | 9/1978 | Frost | 455/33.4 |
| 4,916,691 | 4/1990 | Goodman | 370/85.12 |
| 5,121,126 | 6/1992 | Clagett | 379/59 |
| 5,189,734 | 2/1993 | Bailey et al. | 455/33.2 |
| 5,301,357 | 4/1994 | Thompson | 455/54.1 |
| 5,303,289 | 4/1994 | Quinn | 455/33.2 |

OTHER PUBLICATIONS

Tannenbaum, Andrew S. "Computer Networks", (Prentice Hall, NJ: 1981), pp. 253–265.

Primary Examiner—Edward F. Urban

[57] ABSTRACT

A packetized cellular system in which a mobile quasi-periodically transmits a beacon signal containing an ID number to a first base station in the cell in which it is located for storage with the ID's of other active mobiles in the cell. A copy of a list of the active mobiles in that cell is transmitted to all adjacent cells where they are placed on non-active list. Control of a mobile is handed-off to a second base station upon the receipt of a transmitted ID number of the mobile at the second base station. The mobile is then listed as active in the database of the second base station and non-active in the first base station.

19 Claims, 1 Drawing Sheet

BEACON BASED PACKETIZED CELLULAR SYSTEM WITH REAL-TIME PROCESSING

This application is a continuation of application Ser. No. 08/130,965, filed on Oct. 4, 1993, now abandoned.

FIELD OF THE INVENTION

The instant invention is directed to a packetized, cellular system. In particular, it relates to such a system that requires a limited amount of real-time processing to determine the association of a mobile with a base station for channel assignments and hand-off purposes.

BACKGROUND OF THE INVENTION

There is increasing interest in wireless data communications, such as mobile computing, wireless messaging, facsimile, file transfer, and database access. Together with the trend of untethering computers from the desktop and the desire for universal connectivity, packetized cellular communications is becoming more and more important, and is being considered as the third generation of wireless networks.

Typical cellular networks are comprised of a large number of base stations. Each base station has an assigned coverage area (i.e. cell). In order for a mobile terminal to initiate a call, the cellular phone of the mobile is powered on and it scans the frequencies of a group of control channels for the strongest reception available. Once the appropriate control channel has been selected there is an exchange of messages between the base station and the mobile phone wherein the called terminal number is forwarded to the base station and a transmission channel is allocated to the mobile phone.

Undesirably, such a procedure requires that the mobile handset has the capability to: (1) scan a band of frequencies, (2) make power measurements, and (3) transmit the power measurements to the base station. Substantial functionality in the handset is required. Accordingly, there is a need for a technique that minimizes such processing to increase the efficiency of the mobile terminal.

Additionally, during an active communication, a mobile terminal that is leaving the coverage area of one base station must be "handed-off" to the next base station, whose coverage is the one the mobile is entering. In existing circuit switched systems this hand-off process is done via continuous communications between the base station and the mobile. Such a technique has its own system-level switching and control capability—a higher layer in the mobile network, operating above the individual cells. Through continuous, real-time measurements and comparisons of the signal strength received from the individual base stations, the mobile may initiate the handing-off of its call in progress to another cell. Such switching of a call is done "on-the-fly" without dropping or disrupting the call in progress. In general, substantial overlap in coverage areas between adjacent cells is required to insure high quality reception during hand-offs.

Unfortunately, such a hand-off technique may not be effective in a packet switched wireless system, due to the intermittent or bursty nature of the data traffic. Accordingly, there is a need for an effective hand-off procedure for use in packet switched wireless systems.

Additionally, future mobile platforms may be battery power and computation power limited. Thus, simpler procedures that reduce the amount of processing by the mobile platform may be required.

SUMMARY OF THE INVENTION

The foregoing problems are overcome by the instant technique which is characterized by transmitting a quasi-periodic beacon signal containing ID information from active mobiles to a base station for storage in a database list therein. The database list of the ID information of the active mobiles is periodically transmitted from each base station to all base stations in adjacent cells for storage therein on a non-active mobile list. Also, control of a mobile moving from a first cell to a second cell is handed-off from a base station in the first cell to a second base station, in an adjacent cell into which the mobile is moving, upon the receipt of the beacon signal of the mobile at the second base station.

Additionally, in a packetized cellular system, the instant technique may be used for the purpose of resource (i.e. transmission channel) allocation. A mobile requiring a number of data slots on a transmission channel may also transmit a request for an allocation of that number of slots along with the ID information on the beacon signal. Upon receipt of such a request the base station will reserve the slots on the selected transmission channel.

IN THE DRAWINGS

FIG. 1 depicts a cellular network in which the instant invention is implemented.

DETAILED DESCRIPTION OF THE INVENTION

Figure 1:
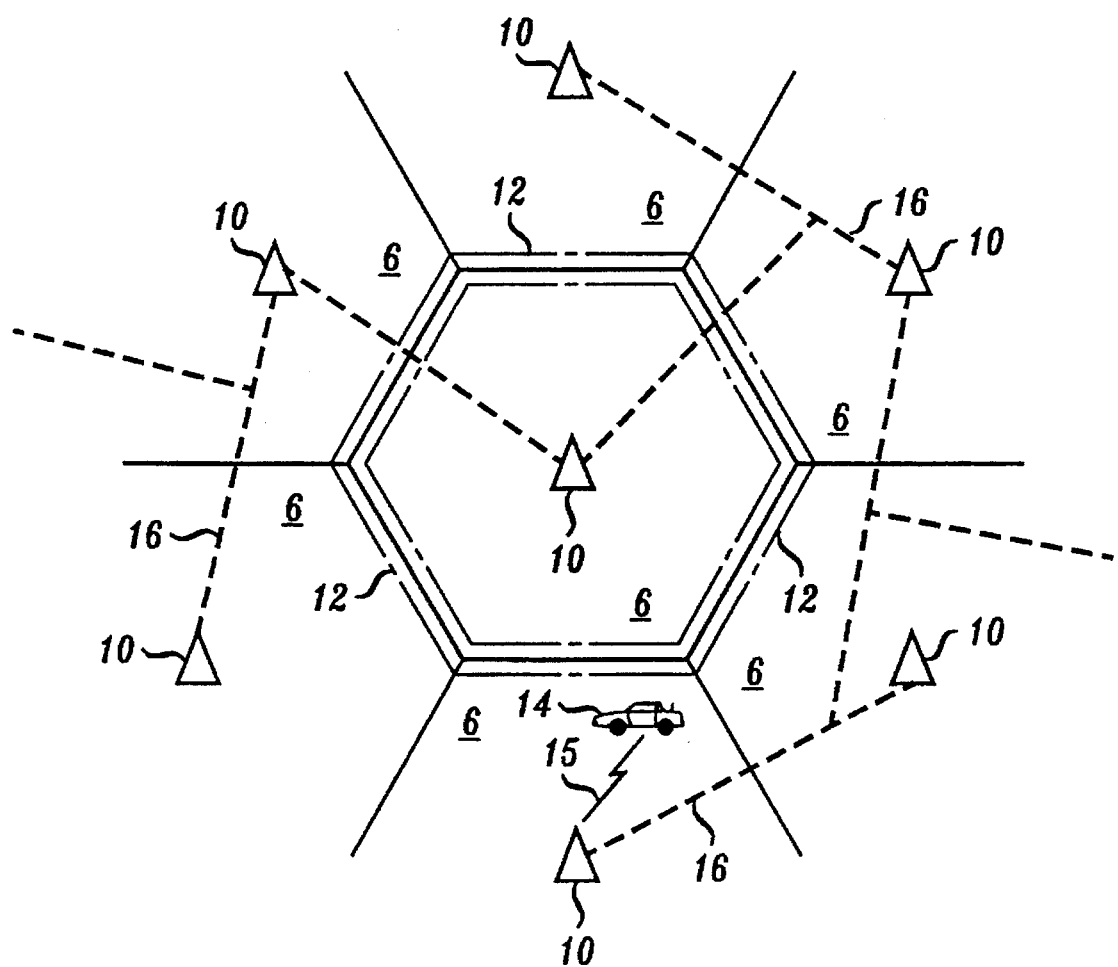

FIG. 1 depicts a portion of an exemplary cellular system 5. The system 5 is typically comprised of a plurality of cells 6, each having a single base station 10 located therein. Any two adjacent cells 6 overlap in an "overlap" area 12. A mobile 14 (i.e. vehicle, airplane, hand-held portable, etc.) is any unit able to physically move from one location to another, which is capable of communicating to a base station 10 via a wireless link 15. The base stations 10 are interconnected by a terrestrial network 16.

In prior art systems, when a call is initiated the mobile 14 scans the frequencies of a group of control channels, transmitted by the base station 10, for the strongest reception available. Once a control channel has been selected there is an exchange of messages between the base station 10 and the mobile 14 wherein the called terminal number is forwarded to the base station over the wireless link 15. The base station 10 is connected to the destination terminal by the terrestrial network 16, wireless links 15 or both.

When the mobile 14 moves from the coverage of a first cell 6, having a base station 10 to a second cell 6 having a second base station 10 it is necessary to hand-off control of the call to the second base station. Such hand-offs may occur repeatedly as a mobile 14 moves through the cellular wireless system 5. Existing systems execute these hand-offs by using their own physical and system-level switching and control capability—a higher layer in the mobile network, operating above the individual cells 6. For example the signal strength of a transmission in progress from the mobile 14 received at the first base station 10 is continuously measured by the mobile and compared to a predetermined threshold value. If the received signal level is below this threshold, the mobile 14 will scan the control channels to determine which is the strongest received base station 10 and initiate a hand-off to that base station. The call can then be switched from the first cell 6 to the second cell 6 "on-the-fly" without dropping the call in progress.

Although such a technique works well when monitoring relatively long continuous calls in progress, it is less effective in a packet switched system due to the bursty or intermittent nature of a data traffic call in progress. Accordingly, there is a need for a technique that is effective when hand-offs of data type traffic calls are required.

The instant packetized, cellular system 5 permits free roaming of mobiles 14 among cells 6 throughout the total coverage area. A mobile 14 can be either in the powered or "on" state or in the power "off" state, referred to herein as "active" and "non-active", respectively. When in the active state the mobile 14 is associated with an ID number. Each user is allocated a worldwide unique ID. These ID numbers can be, for example, similar to telephone numbers, or can be comprised of the user's home Internet Packet (IP) address, concatenated with a user login. The ID number need not be fixed to a mobile 14 but the ID of the mobile 14 can change based upon the mobile's current user (i.e. the mobile assumes the user's ID). Thus, in the instant system, ID numbers identify people and not only terminal devices. When more than one user is associated with the same mobile 14 that mobile may be assigned a special ID.

The present hand-off scheme uses a separate, universal signaling channel (S-channel) that is continuously monitored by every base station 10. The S-channel is a control channel which is used to establish, maintain, update and terminate the associations of the mobiles 14 with the base stations 10. Once such associations are created, there is a separate set of transmission channels that is used for the actual transfer of information, as well as for the set-up and termination procedures.

In the instant invention every active mobile 14 emits a beacon signal, on the S-channel, which includes it's ID information. The beacon transmission period has some built-in jitter. Such a beacon signal is referred to as "quasi-periodic" herein. In other words, the periodicity is "average periodicity". The jitter is required to eliminate correlation of collisions in order to avoid the situation where two colliding beacons will collide forever. The jitter should be on the order of several beacon transmission times. Thus, when the mobile 14 roams through the territory of a base station 10, the ID number of the mobile 14 is continuously being received by that base station.

When a mobile 14 has power on, an association with a base station 10 is created by the quasi-periodic beacon even when there is no calling connection set up. When the mobile 14 initiates a new connection, it signals to the base station 10 the requested destination, along with it's own ID number.

Using the ID numbers transmitted on the beacon each base station 10 maintains a database list of the mobiles 14 in its coverage area—called active mobiles. In addition, each base station 10 maintains in its database a list of all the active mobiles 14 in the neighboring cells 6 which are locally referred to as non-active mobiles. This information is made available by periodic dissemination of the list of active mobiles 14 in each base station 10 coverage area to its adjacent cells 6 through the terrestrial network 16. In addition to the list of the ID numbers of the active mobiles 14 in the coverage area of a base station 10 this information exchange also includes the address of the destinations of the connections (if such exist) of the active mobiles 14 in the coverage area of the base station and the transmission channel numbers associated with the active mobiles.

Also, in the instant technique the beacon signal can incorporate the number of slots required to accommodate the data to be sent over a transmission channel by a mobile 14. The base station 10 then allocates this number of slots in the selected transmission channel. Advantageously, this allocation technique can conserve substantial resources (i.e. transmission channels).

In operation, when a base station 10 receives an ID number and a call destination number of a mobile 14 from a neighbor cell 6 (in which the mobile is active) it sets-up a dormant connection to the call destination terminal. Thus, when the mobile 14 moves into the coverage area of the base station 10 (i.e. when the base station receives the mobile's beacon ID) it updates the status of the mobile 14 to active and assigns a channel to that mobile—the association between the mobile and the base station 10 has been created. A mobile 14 may be associated with more than one base station 10 at the same time (e.g. when located in the overlap area 12). The hand-off mechanism is fully transparent to the mobile 14 which may not know what base station 10 it is associated with.

When a base station 10 fails to receive a beacon from an active mobile 14 for a period of "time-out", the base station 10 determines that the mobile 14 has left its coverage area. The ID number of the mobile 14 is then made non-active in the database and the connection to the mobile destination is also made dormant.

A mobile 14 may be considered active in more that one base station 10, while in the overlapping area 12. In this case, the mobile packets may be duplicated. It is the responsibility of the terrestrial network 16 to identify the duplicates and remove them from the network 5. In some cases, the end points (e.g. transport protocols) may need to eliminate the duplicates. The duplicates correspond to some inefficiency in the terrestrial network 16. However, since the terrestrial network 16 is not the capacity bottleneck, this inefficiency does not pose a significant disadvantage.

As herein before indicated a separate S-channel is used to continuously monitor every base station 10. An exemplary S-channel used in the instant system is based on transmission without coordination as in the ALOHA scheme which is described in detail in COMPUTER NETWORKS, by A. S. Tanenbaum, 1991, pages 253 to 265 and is incorporated by reference herein. However, in the instant technique it is not necessary to listen to the transmission to determine if the transmission was successful or not as in ALOHA. Briefly, the ALOHA scheme lets the users (i.e. mobiles) transmit whenever they have data to be sent. There will be collisions, of course, and the colliding packets will be destroyed. If the packet was destroyed, the sender waits a random amount of time and sends again. The waiting time must be random or the same packets will collide over and over, in lockstep.

It will be understood that the foregoing is merely illustrative of the principles of the invention and not for purposes of limitation. Various modifications can be made by those skilled in the art without departing from the scope and spirit of the instant invention. For instance, the beacon signal from each mobile 14 to the associated base station 10 may be transmitted only when the mobile is within a predetermined distance from the overlap area 12. Advantageously, such a technique will off-load a portion of the processing required of each mobile 14 and base station 10. The predetermined distance may be ascertained by measuring the signal power between the mobile 14 and the base station 10. When the power level falls below a predetermined level the quasi-periodic beacon signal is initiated. Alternatively, the bit-error rate of the signal can be monitored by the base station 10 and/or the mobile 14. A bit-error rate above a predetermined threshold would trigger the operation of the quasi-periodic beacon signal.

What is claimed is:

1. A packetized, cellular communication system having a plurality of cells with a partial overlapping coverage area with adjacent cells, each cell having a single base station therein, comprising:

a plurality of first database lists, each associated with the base station in a respective one of said plurality of cells, each of said first database lists containing information identifying active mobiles travelling in a coverage region associated with the base station in said respective one of said plurality of cells;

a plurality of second database lists, each associated with the base station in said respective one of the plurality of cells, said second database lists containing information identifying active mobiles in cells adjacent to said respective one of the plurality of cells;

means for transmitting a beacon signal containing ID information from active mobiles in a first base station coverage region to a first base station, in the first database list therein; and means for periodically transmitting copies of the list of the ID information of active mobiles in the first station coverage region from the first database list of the first base station to each said second database lists of base stations in cells adjacent to the first base station.

2. The system as set forth in claim 1 characterized by:

means for handing-off control of a mobile from the first base station to a second base station, in an adjacent cell, into which the mobile is moving, upon the receipt of the beacon signal of the mobile at the second base station.

3. The system as set forth in claim 1, wherein:

the beacon signal contains the number of data slots of a transmission channel required to accommodate the packets to be transmitted from the mobile.

4. The system as set forth in claim 1, wherein:

the beacon signal is only activated when the mobile is within a predetermined distance from the overlapping coverage area.

5. The system as set forth in claim 1, wherein:

the beacon signal is transmitted over a separate S-channel.

6. The system as set forth in claim 1, wherein:

the beacon signal contains a call destination number in addition to the ID information.

7. The system as set forth in claim 1, wherein said means for periodically transmitting copies of the list of the ID information includes a terrestrial network.

8. The system as set forth in claim 1, wherein said means for transmitting the beacon signal is adapted to have a transmission period having a predetermined amount of jitter.

9. The system as set forth in claim 8, wherein said jitter is configured to provide a transmission rate in the order of several beacon transmission times.

10. A packetized cellular communications system having a plurality of cells with a partial overlapping coverage area with adjacent cells, each cell having a single base station for receiving transmissions of beacon signals from a plurality of mobiles, comprising:

means for applying an amount of jitter to each beacon signal transmitted from each of said plurality of mobiles;

means, in said plurality of mobiles, for quasi-periodically transmitting respective beacon signals having a respective said amount of jitter and containing ID information from a mobile located in a region of coverage defined by a base station, for storage in a first database list associated with said base station, wherein said amount of jitter acts to prevent interference of more than one beacon signals transmitted from said plurality of mobiles; and means for periodically transmitting copies of the list of ID information of said plurality of mobiles from said base station to all base stations in cells located adjacent thereto.

11. A packetized cellular communication system as recited in claim 10, further including:

a first database list associated with the base station in each of said plurality of cells, said first database list containing information identifying mobiles travelling therein; and a second database list associated with each said base station, said second database list containing information identifying mobiles in adjacent cells thereto.

12. A packetized cellular communication system as recited in claim 10, further including;

means for handing-off control of a mobile from the first base station to a second base station, in an adjacent cell, into which the mobile is moving, upon the receipt of the beacon signal of the mobile at the second base station.

13. A packetized cellular communication system as recited in claim 12, wherein said quasi-periodically transmitted beacon is only activated when said mobile is within a predetermined distance from the overlapping coverage area.

14. A packetized cellular communication system as recited in claim 13, wherein said quasi-periodically transmitted beacon signal is transmitted over a separate channel.

15. A packetized cellular communication system as recited in claim 14, wherein said quasi-periodically transmitted beacon signal contains a call destination number.

16. A method of signaling between a mobile and a base station in a packetized cellular system having a plurality of cells with a partial with a partial overlapping coverage area with adjacent cells, each cell having a single base station for receiving transmissions of beacon signals from a plurality of mobiles, comprising the steps of:

applying an amount of jitter to each beacon signal transmitted from each of said plurality of mobiles;

quasi-periodically transmitting, from said plurality of mobiles, respective beacon signals having a respective said amount of jitter containing ID information to a base station for storage in a database list associated with said base station, wherein said amount of jitter acts to prevent interference of more than one beacon signals transmitted from said plurality of mobiles, and periodically transmitting the ID information of the plurality of mobiles from said base station to all base stations associated with cells located adjacent thereto for storage therein on non-active mobile lists.

17. A method of signaling between a mobile and a base station as recited in claim 16, further including the steps of:

periodically transmitting copies of the active mobiles ID list from the first base station to all base stations associated with cells located adjacent to the first cell;

storing the list of ID numbers in the database of the base stations of each of the adjacent cells and characterizing the ID numbers as non-active;

receiving the beacon signal containing the ID number of the mobile at the second base station when the mobile moves into an overlapping area of coverage of the first and second cells; and updating the list at the second base station to change the status of the mobile from the non-active to active to transfer control of the mobile to the second base station.

18. A method of signaling between a mobile and a base station as recited in claim 16, further including the steps of:

provide a first database in each said base station;

providing a second database in each said base station;

storing in each said first database of each base station, information identifying active mobiles travelling therein; and storing in each said second database of each base station, information identifying active mobiles located in adjacent cell thereto.

19. A method for handing-off control of calls in a packetized, cellular system, comprising the steps of:

transmitting a beacon signal comprising ID numbers for identifying active mobiles travelling in a base station coverage region of a first cell, for storage in a first database list associated with the first cell;

periodically transmitting ID numbers from the first database list of the first cell to all the cells located adjacent to the first cell;

storing the transmitted ID numbers in a second database list associated with each said cell located adjacent the first cell characterizing the ID numbers as non-active mobiles;

receiving the beacon signal containing the ID numbers of the mobiles at one of said cells located adjacent to the first cell when the mobiles move into an overlapping area of coverage with the one adjacent cell; and updating a first database list of the adjacent cell to the first cell to change the status of the mobiles from non-active to active to transfer control of the mobiles to the adjacent cell.

\* \* \* \* \*